United States Patent

[11] 3,627,036

| [72] | Inventor | William W. Gilbert<br>372 South Williamsburg, Birmingham, Mich. 48010 |
|---|---|---|
| [21] | Appl. No. | 6,893 |
| [22] | Filed | Jan. 29, 1970 |
| [45] | Patented | Dec. 14, 1971 |

[54] HEAT EXCHANGE SYSTEM
9 Claims, 12 Drawing Figs.

[52] U.S. Cl............................................. 165/107,
23/288 E, 23/288 M, 165/6, 198/22, 198/85, 263/19 B

[51] Int. Cl..................................................... F28d 19/02

[50] Field of Search........................................... 165/107,
106, 6, 7; 263/19 B; 23/288 E, 288 M; 74/216.3; 198/1, 22, 85

[56] References Cited
UNITED STATES PATENTS

| 2,424,055 | 7/1947 | Rousseau.................... | 198/108 |
| 2,525,261 | 10/1950 | Henderson.................... | 62/430 X |
| 2,551,821 | 5/1951 | Bengtson...................... | 74/216.3 |
| 2,869,378 | 1/1959 | Fischer......................... | 74/216.3 |
| 3,148,037 | 9/1964 | Szego........................... | 23/288.3 E X |
| 2,445,554 | 7/1948 | Bergstrom..................... | 263/19 B |
| 2,650,814 | 9/1953 | Howden........................ | 263/19 B |

FOREIGN PATENTS

| 929,989 | 6/1963 | Great Britain................ | 165/107 |

*Primary Examiner*—Albert W. Davis, Jr.
*Attorney*—Wm. W. Gilbert

ABSTRACT: A high-temperature heat exchange system utilizing bodies of solid material as a heat exchange medium comprising a tubular conduit defining a flow path between a hot zone and a cooler zone, a conduit arranged to define, contain, and direct movement of the solid bodies in single file around a closed loop or path in heat exchange relation with fluid to be heated or cooled.

Patented Dec. 14, 1971
3,627,036
2 Sheets-Sheet 1
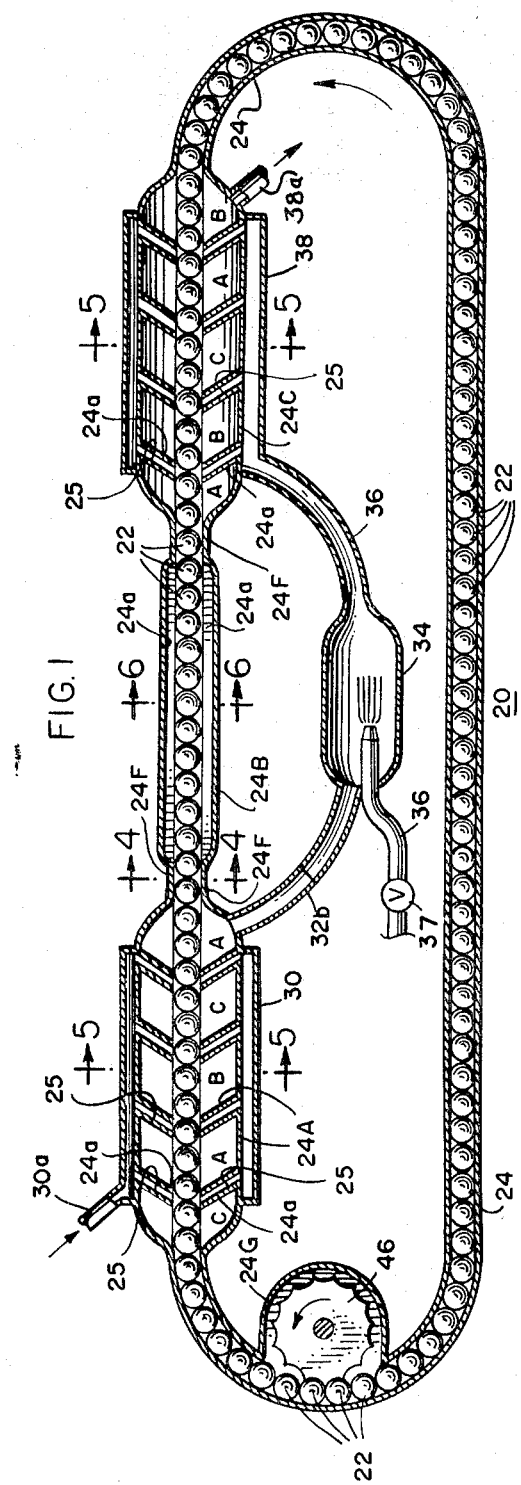
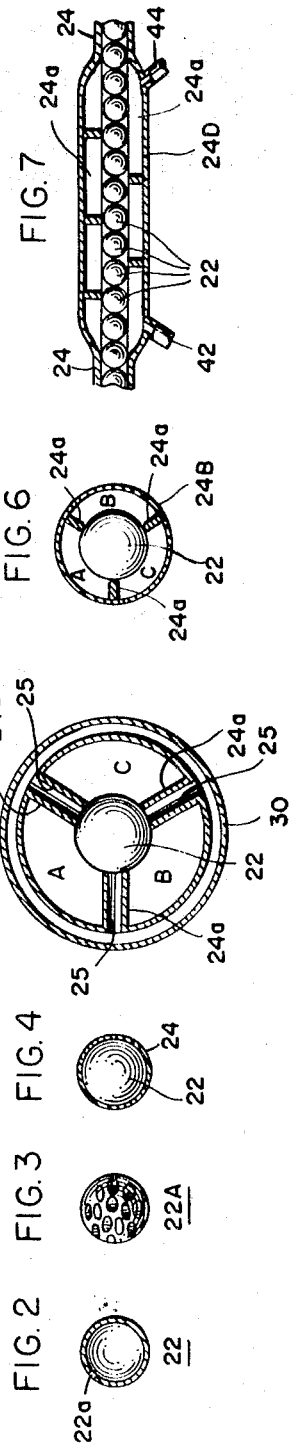
INVENTOR:
WILLIAM W. GILBERT
BY
Mason, Kolehmainen, Rathburn & Wyss
ATT'YS

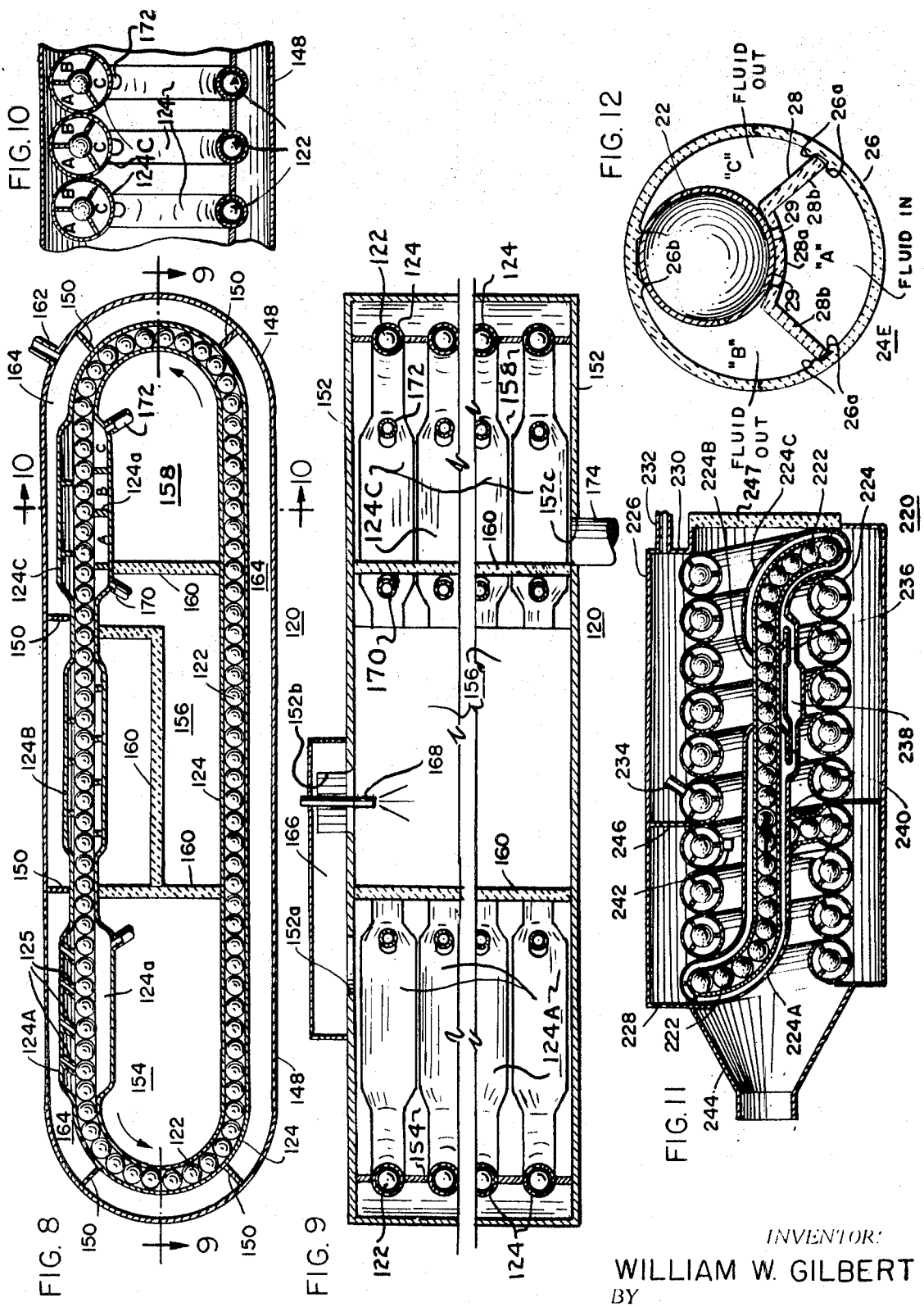

HEAT EXCHANGE SYSTEM

The present invention relates to a new and improved heat exchange system and more particularly relates to a heat exchange system wherein heat transfer is effected through the medium of solid bodies movable along a path in a single file.

In the past, bodies of solid material, such as pebbles of refractory material, metals, and other materials, have been used as a heat exchange medium in various types of heat exchange systems. In some of the prior art apparatus, known as "pebble heaters," the solid bodies or pebbles are handled in bulk quantities with random, uncontrolled movement of the individual bodies within the mass of pebbles in the various stages in the cycle. Accordingly, the motion and position of each individual solid body within the mass is not uniform or standardized. Because the position of each heat exchange element in relation to the moving stream of hot or cold fluid is not positively controlled or defined, many of the movable solid bodies were subjected to greater periods of heating or cooling than others, in addition to significant impact and shear stresses caused by their movement in a random jumbled state through the different zones or stages of the heat exchange system, such as the feeding, conveying, and elevating zones and the heating and cooling stages.

Because of this, breakage and fracture of the solid material heat exchange bodies often resulted, and this caused an accumulation many times of fine material at critical points in the system resulting in system stoppage, overheating problems, and other mechanical trouble.

Another disadvantage of prior art systems using solid body heat exchange elements is the elaborate mechanical containment systems required and the elaborate motive power devices required for moving the pebbles around the system without incurring excessive mechanical stresses resulting in excessive breakage losses. The solid body, heat exchange elements are subject to relatively high thermal stresses and shock, and accordingly, the pellets must be handled mechanically with care to prevent breakage.

The present invention has for an object the provision of a new and improved heat exchange system using solid bodies as a heat exchange medium, which system eliminates and/or reduces the aforementioned problems of prior art systems.

Another object of the present invention is to provide a new and improved heat exchange system of the character described wherein the individual heat exchange elements are solid bodies moved around a closed path in a single file string in a manner whereby the individual elements are not subjected to excessive mechanical and thermal stresses and shocks.

Yet another object of the present invention is to provide a new and improved heat exchange system of the character described having simple and effective means for isolating or sealing off the solid body heat exchange elements from the fluids of the system prior to and after contact with fluid in the regions where heat exchange between the fluids and the elements takes place.

Another object of the present invention is to provision of a new and improved heat exchange system of the character described in which fluid, either gaseous or liquid, is passed in direct heat exchange contact with the solid body heat elements as they move around the systems.

Yet another object of the present invention is to provide a new and improved heat exchange system of the character described including new and improved conduit means for defining a path of travel of solid body heat exchange elements around the system.

Another object of the present invention is to provide a new and improved heat exchange system of the character described including new and improved means for defining the path of movement of solid body heat exchange elements wherein said means may comprise portions of a thermoelectric generator.

Another object of the present invention is to provide a new and improved heat exchange system wherein heat is transferred between hot and cold mediums without bringing the mediums in direct contact with one another and without requiring a heat conductive seal or barrier between the mediums.

Another object of the present invention is to provide a heat exchange system capable of sustaining a continuous, as opposed to a batch-type or intermittent-chemical, reaction between two or more fluids without bringing the fluids into direct contact with one another.

Still another object of the present invention is to provide a new and improved system wherein the solid body heat exchange elements are used as catalysts in a chemical reaction, as the elements travel around the system.

Another object of the present invention is to provide a new and improved heat transfer system of the character described which is able to operate at relatively high temperatures and in which significant quantities of heat are transferred with a maximized efficiency.

The foregoing and other objects and advantages of the present invention are accomplished by a new and improved heat exchange system comprising tubular conduit means defining a path between a hot zone and a cold zone. A plurality of heat exchange elements comprising bodies of solid material capable of absorbing significant quantities of heat at elevated temperatures are mounted for movement in single file longitudinally of the conduit system between the hot and cold zones to effect heat transfer therebetween. The conduit defines therein one or more fluid passages running longitudinally thereof for directing fluid flow around the moving solid bodies to establish a heat exchange relation between the solid body elements and the fluid. The arrangement described may be used in chemical process applications wherein the movable solid bodies are catalysts for the chemical reaction involved or the solid body elements may serve to carry heat to and from hot and cold junctions in a thermoelectric generator application.

The foregoing and other objects and advantages of the present invention will best be understood by reference to the following detailed description taken in conjunction with the drawings, in which:

FIG. 1 is a somewhat schematic presentation in sectional view of a new and improved heat exchange system constructed in accordance with the features of the present invention;

FIG. 2 is a transverse cross section taken through one type of the solid body heat exchange element used in the system of FIG. 1;

FIG. 3 is an elevational view showing another type of solid body heat exchange element having a modified outer surface;

FIG. 4 is a transverse cross-sectional view taken substantially along lines 4—4 of FIG. 1;

FIG. 5 is a transverse sectional view taken substantially along lines 5—5 of FIG. 1;

FIG. 6 is a transverse sectional view taken substantially along line 6—6 of FIG. 1;

FIG. 7 is a longitudinal sectional view of a modified form of heat receiver used in the heat exchange system of FIG. 1;

FIG. 8 is a transverse cross-sectional view of a modified form of heat exchanger constructed in accordance with the present invention and employing a plurality of conduit loops arranged in stacked array;

FIG. 9 is a sectional view taken substantially along line 9—9 of FIG. 8;

FIG. 10 is a transverse sectional view taken substantially along line 10—10 of FIG. 8;

FIG. 11 is a modified form of the present invention wherein a single elongated tube defining a flow path for the moving solid bodies is arranged into helical coils to provide for added travel time in contact with the fluid to be heated or cooled;

FIG. 12 is a transverse cross-sectional view similar to FIG. 5 taken through a modified form of heat exchange chamber constructed in accordance with the present invention.

Referring now, more particularly, to the drawings and the embodiment shown in FIG. 1, therein is illustrated a new and improved heat exchange system constructed in accordance with the features of the present invention and referred to generally by the reference numeral 20. The heat exchange system 20 includes a plurality of individually separate, movable, heat exchange elements or bodies 22 formed of solid material. The material chosen for the elements 22 is capable of holding substantial quantities of heat at the elevated temperatures required and the bodies or elements are arranged to travel single file in an elongated string through a closed loop or path defined by the system. The closed loop or path is maintained by a tubular conduit 24 having an inside diameter which is slightly larger than the maximum diameter of the solid body heat exchange elements 22 so that the elements may move freely around the path or circuit without binding and with a minimum of mechanical stresses applied thereto during movement.

The heat exchange elements 22 are preferably spherical in shape although other shapes could be used (for example, cylindrical), and as shown in FIG. 2, the elements may be formed with hollow interior cavities and provided with a small port 22a in order to relieve any internal pressures developed because of heating and cooling and the resultant expansion and contraction of the elements. The elements 22 may be constructed of refractory materials, ceramic materials, various metals, such as steel, aluminum alloys, etc., and any other solid (as distinguished from gaseous or liquid) materials capable of carrying significant heat quantities and withstanding the thermal, mechanical and chemical stresses involved in a particular application. In this connection, if the spherical elements 22 are formed with hollow centers, the elements may be filled and sealed with gaseous fluids or liquids inside having the desired physical and thermal characteristics in order to increase the heat carrying capability of the individual elements. It should also be noted that the material used for the elements 22 may be a dielectric material or an insulating surface coating may be provided for thermoelectric generator applications. Moreover, in chemical applications, the elements 22 may have an outer surface or a surface coating of material which acts as a catalyst for the particular chemical process involved.

In accordance with the present invention, heat transfer is effected by moving the solid body, heat exchange elements 22 between hot and cold zones having gaseous or liquid fluids passing in heat exchange relation with the moving elements. The heat exchange takes place in enlarged diameter sections or chambers 24A, 24B, 24C, 24D, etc., of the conduit 24. These heat exchange sections have enlarged internal diameters which are greater than that of the special elements 22, and each section includes means therein for guiding the elements 22 as they move from one end to the other with a limited lateral movement. In the system 20, the chambers 24A, 24B, and 24C are formed with a plurality of generally longitudinally extending, fluid flow channels A, B, C, etc. (FIGS. 5 and 6) for passing fluid in heat exchange relation with the moving elements. The elements 22 travel in a path along the axial center of the chamber sections 24A, 24B, 24C, 24D, etc., and are guided on the path by a plurality of radially inwardly directed, generally longitudinally extending ribs 24a which form the channels A, B, C, etc. The ribs may be straight or may be formed in a helical pattern and the inner edges of the ribs may be rounded in order to reduce friction between the moving spheroids 22. A different number of ribs 24a may be provided to define more or less than the three fluid channels A, B, and C that are shown.

The ribs 24a may be relatively short in depth, as shown in FIG. 6, or relatively deep, as in the chambers 24A and 24B, but in either case the rounded inner edges of the ribs define supports for guiding movement of the spherical elements as they move in single file and with minimum frictional contact through the respective heat exchanger sections 24A, 24B, 24C, 24D, etc. When the ribs 24a are formed in a helical configuration, a rotary or turning motion may be imparted to the moving solid body elements 22, and a more uniform heating or cooling of the surfaces of the elements by the fluid passing through the flow channels A, B, C, etc. may be achieved.

Because the heat exchange elements 22 are supported and guided along the single file path by the rounded inner edges of the ribs 24a, practically the entire surface of spheroids is continuously being exposed to the fluid flowing through the channels or passages A, B, C, etc., in the enlarged diameter chamber sections 24A, 24B, 24C, 24D, etc., for effecting an excellent heat exchange relation between the elements and the fluids.

This arrangement provides for an excellent direct heat exchange relation between the outer surface of the spherical elements 22 and the fluids (either liquid or gas) flowing in the passages A, B, C, etc. The speed of movement of the solid material elements 22 around the loop or path defined by the conduit 24 is adjustable, and the specific type of material chosen for the heat exchange elements, the dimensions (including wall thickness if hollow) of the elements, as well as the dimensions and types of materials used for the tubular conduit 24, the heat exchange sections or chambers 24A, 24B, 24C, 24D, etc., and the ribs 24a therein are chosen and selected to provide the desired operating parameters for the heat exchange system 20 in a given application.

Because the elements 22 move in single file along the path or loop defined by the tubular conduit 24, mechanical stresses and shocks on the individual elements are greatly reduced over that of prior art apparatus. Breakage of the elements is greatly reduced or eliminated entirely in comparison to prior art systems wherein the heat exchange elements or "pebbles" are randomly handled in a jumbled or random oriented condition, much like the handling of gravel or rocks in a hopper system. The present invention eliminates the aforesaid mechanical breakage problem and reduces thermal stresses on the elements because the individual elements are treated uniformly throughout the operating cycle.

In FIG. 12 is shown a cross-sectional view of a modified form of heat exchange conduit section or transfer chamber 24E which includes an outer jacket 26 of refractory material having a substantially circular cross section. The jacket 26 is formed in two or more concave sections keyed together, as shown, in order or simplify the fabrication of the structure, and curved, reducing sections are provided at opposite ends of the chamber 24E to transition down to the diameter of the tubular conduit 24. The spherical elements 22 are guided through the chamber 24E in single file on a path which is eccentric on the longitudinal axis of the jacket 26 by means of a guide member 28 which, along with the outer jacket 26, may be formed of refractory material or other materials suitable for the temperatures developed in a particular application. The guide member 28 extends longitudinally of the chamber 24E and is roughly U-shaped or channel-shaped in cross section with a concave web or bight portion 28a forming a guide trough for the spherical elements 22. The member 28 includes a pair of spacer flanges or legs 28b having outer edges keyed to the inside wall surface of the jacket 26 between pairs of ribs 26a and the guide member defines a fluid channel A in the chamber 24E through which gaseous or liquid fluid may flow.

The jacket 26 of the chamber 24E also may include a pair of guide ribs 26b of the inside surface opposite the web or bight portion 28a of the U-shaped guide member 28 to help guide the spherical elements through the chamber 24E. Gaseous or liquid fluid for heat exchange relation with the moving spherical elements 22 in the chamber 24E may be introduced from the flow channel A through a plurality of ports or openings 29 in the bight portion 28a into flow channels B and C on opposite sides of the string of elements in the chamber. The fluid may also flow from the channels B and C through the ports 29 into the channel A and, if desired, more than one guide member 28 may be provided to guide the elements along the desired path in single file.

In accordance with the present invention, in the heat exchange system 20, the enlarged heat exchange chamber or section 24A of the conduit 24 is provided with an outer jacket 30 closed at opposite ends, and cold fluid, such as air, is introduced into one end of the jacket 30 through an inlet conduit 30a (FIG. 1). The fluid circulates around the conduit section 24A within the outer jacket 30 and is directed inwardly toward the spherical elements 22 through a plurality of nozzlelike passages 25 formed in the ribs 24a at desired spaced locations along their length. The fluid is directed at high velocity in a direction angularly intersecting the path of movement of the spherical elements 22 along the central axis of the chamber 24A, and moves or aids in moving the spherical elements 22 around the system through the loop or closed circuit defined by the conduit 24. This fluid also helps in reducing friction between the moving elements 22 and the rounded inner edges of the supporting guide ribs 24a within the heat exchange chambers 24A, 24B, 24C, etc. At the left-hand end, the enlarged cross section, heat exchange chamber 24A is again reduced to the nominal diameter of the conduit 24 which is slightly larger than the maximum diameter of a spherical element 22 (accounting for increases because of heating and manufacturing tolerances) and thus only small amounts of the fluid are carried by the elements 22 into the reduced, nominal diameter portion of the conduit 24 from the heat exchange chamber 24A. Most of fluid which has now been heated by contact with the moving elements 22 flows through the channels A, B, C, etc., and passes out of the chamber section 24A through an outlet conduit 30b into a separate combustion chamber 34. Fuel is introduced into the combustion chamber 34 through a line 36 having a suitable control valve 37 for regulating fuel flow. As the fuel is burned in the combustion chamber 34 energy is supplied to the system and the high-temperature products of combustion pass through a conduit 36 into the left-hand end of an annular chamber formed by a jacket 38 and mounted around the outside surface of the enlarged tubular heat exchanger section 24C.

The high-temperature products of combustion flow around the chamber section 24C inside the outer jacket 38 and are directed radially inwardly into contact with the moving spherical elements 22 passing along the central axis longitudinally of the chamber section. The high-temperature fluid is directed against the moving elements 22 at an acute angle and at high velocity through a plurality of passages 25 formed in the guide ribs 24a in a manner similar to that described in connection with the chamber 24A. Contact with the hot fluid causes the elements 22 to absorb heat and rise in temperature. As they pass from the right to the left-hand end of the chamber 24C, the heated elements 22 carry substantial quantities of heat to other portions of the system 20 as the elements move from the chamber 24C around the path defined by the conduit. After the high-temperature fluid gives up heat to the spherical elements 22 as it moves through the fluid channels A, B, C, etc., in the chamber 24C, the fluid is exhausted from the chamber through an outlet fitting 38a. The exhausted fluid may be used for additional purposes if desired.

When the spherical elements 22 enter the right-hand end of the chamber section 24C, the elements are relatively cold and are elevated in temperature by contact with the high-temperature gases from the combustion chamber 34. During this process, heat is absorbed by the spherical elements 22 which comprise the heat exchange medium of the system 20. Because the heat exchange medium is in a solid rather than a liquid or gaseous state, many problems encountered with fluid heat exchange mediums are eliminated. For example, if liquid metal is used as a heat exchange medium there must be a closed containment for the metal, and the heat must be transferred to or from the metal through the walls of the containment. In addition, most metals suitable for use for such purposes, freeze or solidify at ambient atmospheric temperatures. With the present solid material heat exchange medium (elements 22) high temperatures are possible without the necessity for transferring heat through a containment wall, and there is no change of state in the medium as it cools.

As the elements 22 leave the chamber 24C, they pass through a necked down conduit section 24F having a diameter substantially equal to the nominal diameter of the conduit 24. The necked down section 24F acts as a valve and minimizes the amount of fluid carried by the elements into the chamber section 24B. The chamber section 24B functions as a heat receiver and the high-temperature spherical elements 22 give up heat to the walls thereof, which walls may also be used for heating a second fluid passed over the outer surface thereof.

As shown in FIG. 6, the heat receiver 24B includes radial ribs 24a which define fluid channels A, B, C, etc., and the depth of the ribs can be designed to provide the desired temperature for the outer wall.

A modified receiver section 24D is shown in FIG. 7 wherein the spherical elements 22 are used for heating a second type of fluid passed internally through the chamber via an inlet 42 at one end and an outlet 44 at the opposite end. In all of the heat receivers 24B or 24D, the temperature of the spherical elements 22 is reduced as the elements pass from one end to the other and, at the left-hand end of the receiver a second necked down section 24F is provided to reduce the amount of fluid transferred from one section to another in the system by the moving spherical elements. As the spherical elements 22 pass into the chamber section 24A, the heat is given up to the incoming fluid passing through the jacket 30. In the chamber section 24A, heat exchange takes place at a temperature which is somewhat less than that in the chamber 24C, and the moving solid material elements 22 give up heat to the fluid initially introduced into the system 20 through the inlet 30a. This fluid serves an additional purpose in lubricating the elements 22 and reducing the frictional contact between the moving spherical elements 22 themselves and between the elements and the supporting surfaces of the tubular conduit 24 and the guide ribs 24a. In addition, the fluid is used to move or assist in moving the spherical elements 22 in a counterclockwise direction around the path defined by the tubular conduit 24.

As the moving spherical elements 22 pass out of the left-hand end of the chamber section 24A, the elements are at a temperature somewhat below the maximum, but the elements may still contain considerable quantities of heat energy which can be used before the elements complete the cycle and again enter the right-hand end of the chamber 24C.

If required, an alternate source of motive power for moving the spherical elements around the system in the form of a drive wheel 46 may be provided or, in cases where speed of the elements 22 through the system is critical, the wheel 46 may be connected to a suitable governor mechanism or speed-limiting mechanism for maintaining a desired range of the velocity of the moving spherical elements 22 through the system. The wheel 46 may be driven as a turbine by the moving spherical elements to do work in rotating a shaft. The conduit section 24 is enlarged as at 24G around the wheel 46 to form a fluidtight enclosure, if desired. Because the spherical elements 22 expand and contract in size as the temperature changes in the system, the interior diameter of the tubular conduit 24 and the means path diameter for the elements as defined by the ribs 24a within the enlarged heat exchange sections 24A, 24B, 24C, 24D, 24E are dimensioned with enough clearance in order to accommodate these variances because of thermal activity. While the tubular conduit 24 is shown in a single, generally elliptical loop configuration, other arrangements, shapes and lengths may be set up as long as the free movement of the elements in a single string file along a desired path or cycle is not restricted or interfered with to any great extent.

In order to aid in aerodynamically moving the spherical elements 22 around the path or cycle defined by the tubular conduit 24, the outer surface of the spherical elements may be provided with concave indentation or pock marks similar to a golf ball, as shown in the spherical elements 22A of FIG. 3. The pock marks improve the aerodynamic characteristics of the spherical elements when fluid power is used as the motive power for the system.

Within each of the chambers 24A, 24B, 24C, 24D, 24E, etc., fluid channels are defined for passing fluid in heat exchange relation with the moving elements. In the chambers 24A, 24B, 24C, and 24D, the ribs 24a, which define the fluid flow channels, also provide guiding structure for directing the movement of the elements. The ribs 24a may be straight and extended parallel of the longitudinal axis of the chambers or may be arranged in a spiral or helical configuration.

It is to be noted that the difference in diameter between the spherical elements 22 or 22A and the diameter of chambers 24A, 24B, 24C, 24D, 24E, etc., is set up to provide for the desired heat transfer relation between the fluids (either gaseous or liquid) and the moving spherical elements 22. At some point, further increases in diameter of the tubular conduit 24 or chamber sections of the spherical elements 22 become impractical and, therefore, to substantially increase the heat transfer capacity of a given diameter system, an arrangement, as shown in FIGS. 8, 9, and 10, may be provided. The heat transfer system 120 therein illustrated employs a plurality of closed path loops of tubular conduits 124 arranged in a stack or battery array, one on top of another, within a supporting casing 148 which may be generally elliptical or oblong in cross section as shown. The loops are supported inside and spaced from the casing wall by means of ribs 150, and the opposite ends of the casing are sealed off by closure walls 152. The space defined within the stack of tubes 124 enclosing the stack or battery of conduit loops 124 is divided into a preheating fluid chamber 154, a combustion or heat generation chamber 156, and an exhaust chamber 158 by means of baffles or dams 160. Cold fluid enters the chasing 148 through an inlet 162 (FIG. 8) and passes into an outer plenum chamber 164 defined around the outside of the stacked conduit loops 124. Fluid from the plenum enters the heat exchanger sections 124A of the stacked loops 124 through the passages 125 and formed in the ribs 124a. This fluid assists in moving the elements 122 around the system. The air or fluid is preheated in the chambers 124A and passes into the preheat section 154 at an elevated temperature. The preheated air then passes upwardly through an exit opening 152a in the wall 152 into an external plenum chamber 166. Preheated air from the plenum chamber 166 is directed into the combustion or heat generating chamber 156 through an inlet fitting 152b, and fuel is introduced through a nozzle 168 and is burned. The products of combustion at elevated temperatures pass into the chamber 156 and into the heater exchange sections 124C through inlets 170 (FIG. 8) at the left-hand ends thereof. These high-temperature combustion gases heat up the spherical heat exchange elements 122 moving through the chamber 124C and exit the opposite end of the heat exchange sections 124C through outlet fittings 172 (FIG. 8). The fluid passing through the outlets 172 is directed into the exhaust chamber section 158 and exits the system 120 through an exhaust pipe 174 connected to an opening 152c in the opposite closure wall 152. The heat exchange system 120 thus employs a stacked array comprising a plurality of tubular loops 124 or conduit circuits, each of which comprise an individual heat exchange system having elements 122 moving in single file around the cycle. The stacked system 120 utilizes a common source of fluid for all of the individual heat exchange systems and the capacity of the overall system 120 is increased to the desired value by providing the desired number of individual heat exchange loops or systems in the stack or array thereof contained within a single structural casing 148, and in this manner optimum sized spherical elements 122 may be utilized, even in applications wherein extremely large quantities of heat exchange are required.

Referring now to FIG. 11, therein is illustrated another embodiment of the present invention comprising a modified heat exchanger system 220 which employs a continuous elongated tubular conduit 224 wound in helical form with a plurality of interconnected coils, as shown. Each individual spherical heating elements 222 travels the entire length of the elongated tubular conduit 224, including all of the coils or loops in the helical array. Opposite end coil loops are connected by a longitudinally extending segment 224B and, as shown, four of the coils adjacent one end of the system 220 comprise a continuous heat exchange section of a chamber 224A while the remaining six coils comprise a second heat exchange chamber or section 224C. The helical array of coils is mounted in a generally cylindrical outer casing section 226 having opposite end walls 228 and 230, and cold fluid is introduced into one end of the casing through an inlet fitting 232 on the end wall 230. This fluid passes around the outside of the second mentioned group of coils and enters the chamber section 224C (having six coils therein) through an inlet fitting 234. The fluid flows through the channels A, B, and C defined within the section 224C in a direction opposite that of the spherical elements 222 and is preheated by contact therewith. This preheated fluid passes from the chamber section 224C through a conduit 236 into a combustion chamber 238 wherein fuel is burned to furnish heat to the system. The products of combustion are directed from the combustion chamber into the first-mentioned array of coils comprising the heat exchanger section 224A through a conduit 240, and this high-temperature fluid heats up the spherical elements 222 as they travel through coils of the helical array. After passing through the coils in the chamber section 224A, the products of combustion are discharged into the opposite end of the casing section 226 through a discharge fitting 242. The spent fluid is exhausted from the casing 226 out through an exhaust outlet 244 on the opposite end wall 228.

The casing 226 is divided by means of an internal baffle ring 246 into sections defining hot and cool zones, and each chamber section contains several coils of the heat exchanger conduit. The right-hand end of the casing is closed with a thick-walled center portion which may serve as a burner firewall when the opposite ends of the tubular conduit 242 are joined outside of the casing 226. The system 220 is generally similar in operation to the system 120 previously described except that each spherical element 222 travels through all of the coils in the system rather than only a single loop.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A heat exchanger of the type wherein heat from a hot fluid is transferred by direct contact in one zone or chamber to a plurality of separate heat exchange elements made of solids which are movable through a means to isolate them from the hot fluid to other zones or chambers where their acquired heat is transferred by direct contact or radiation to another fluid or fluids or to the walls of their containment and wherein the solid heat exchange elements are held in a continuous string aligned loop of touching elements by a continuous guiding track comprised in part of tubular conduits, in part of portions of tubular conduits and in part of guides within the heat exchanging zones or chamber such that when any one or several of the elements is pushed along the track at any point in the loop of touching elements a given distance all of the elements are forced to circulate around the continuous loop guiding track a like distance, each element being moved by the next following element, the position of each element being fixed longitudinally with respect to the track by the next following touching element and the next preceding touching element and wherein motion means are provided to effect circulation of the solids around said track and wherein the said continuous guiding track portions within the chamber or zone where heat is transferred from the heating fluid to the movable solids and within the chambers or zones where heat is transferred from the heated solids to other fluids contain ports to admit the heating fluid or the fluids to receive heat which direct said fluids against said movable solids in such a manner as to reduce friction and lubricate the track at points of contact between the movable solids and the guiding track.

2. The heat exchange system of claim 1 wherein means are provided to apply motion to one or more of the heat exchange elements in said loop at a point in said continuous loop track external to the heat exchange zones of the loop so that all of said elements are forced to circulate around the loop track and through the heat exchange zones or chambers of said loop regardless of the position of the apparatus, and independently of gravity.

3. The heat exchange system of claim 1 wherein the means to isolate the heated movable solids from the heating fluid after they have been heated and from the heat receiver or heat receiving fluid after they have given up heat consists of a tubular portion of the continuous guiding track which exactly fits with allowable tolerance for passage, the movable solid heat exchange elements and through which each element is pushed by the next following element.

4. The heat exchange system of claim 1 in combination with at least another identical system and joined together in a parallel stacked array of said heat exchange systems.

5. The heat exchange system of claim 4 wherein said array forms a conduit which is externally housed and internally partitioned such that the stacked array, housing and partitions form conduits for commonly conveying heating fluids from a common source to and from the heating zones or chambers of said stacked heat exchange systems and form conduits for commonly conveying fluids to be heated from a common source to and from the heat receiving zones or chambers of said stacked heat exchange systems.

6. The heat exchange system of claim 1 wherein the said continuous guiding track loop comprises an elongated tubular conduit helical configuration with a plurality of coils.

7. The heat exchange system of claim 6 wherein said helical configuration is externally housed and internally partitioned such that the helical configuration, the housing, and the partitions form conduits for conveying heating fluids to and from the heating zone or chamber of said helical configuration heat exchanger and form conduits for conveying fluids to be heated to and from the heat receiving zones or chambers of said helical configuration heat exchanger.

8. The heat exchanger of claim 1 wherein the said movable heat exchange elements formed of solid material have at least a surface coating which comprises a catalyst for enhancing a chemical reaction affecting fluids passing in heat exchange relationship with said elements.

9. The heat exchange system of claim 1 wherein the said continuous guiding track portions within the chamber or zone where heat is transferred from the heating fluid to the movable solids and within the chambers or zones where heat is transferred from the heated solids to other fluids contain nozzlelike ports to admit the heating fluid or fluids to receive heat, the longitudinal axes of said ports being set at an angle intersecting the path of movement of said movable solids such that the jets of heating fluid or fluids to be heated passing through said ports impinge on said solids in such a manner as to assist in propelling the solids around the continuous guiding track.

* * * * *